United States Patent
Litters et al.

(10) Patent No.: US 11,473,032 B2
(45) Date of Patent: Oct. 18, 2022

(54) CONSTANT VELOCITY JOINT HAVING A BOOT

(71) Applicant: Fuchs Petrolub SE, Mannheim (DE)

(72) Inventors: Thomas Litters, Hettenleidelheim (DE); Alexander Liebenau, Osthofen (DE)

(73) Assignee: FUCHS PETROLUB SE, Mannheim (DE)

(*) Notice: Subject to any disclaimer, the term of this patent is extended or adjusted under 35 U.S.C. 154(b) by 0 days.

(21) Appl. No.: 16/710,817

(22) Filed: Dec. 11, 2019

(65) Prior Publication Data
US 2020/0115650 A1 Apr. 16, 2020

Related U.S. Application Data

(63) Continuation-in-part of application No. 15/427,878, filed on Feb. 8, 2017, now abandoned, which is a continuation-in-part of application No. 13/576,857, filed as application No. PCT/DE2011/000087 on Jan. 31, 2011, now abandoned.

(51) Int. Cl.

| | | |
|---|---|---|
| *C10M 169/00* | (2006.01) | |
| *C10M 169/02* | (2006.01) | |
| *C10M 119/26* | (2006.01) | |
| *C10M 117/06* | (2006.01) | |
| *C10M 113/08* | (2006.01) | |
| *C10M 117/00* | (2006.01) | |
| *C10M 123/04* | (2006.01) | |
| *C08J 7/02* | (2006.01) | |
| *C10M 169/04* | (2006.01) | |
| *C10N 20/04* | (2006.01) | |
| *C10N 30/02* | (2006.01) | |
| *C10N 50/10* | (2006.01) | |
| *C10N 50/00* | (2006.01) | |

(52) U.S. Cl.
CPC .......... *C10M 169/02* (2013.01); *C08J 7/02* (2013.01); *C10M 113/08* (2013.01); *C10M 117/00* (2013.01); *C10M 117/06* (2013.01); *C10M 119/26* (2013.01); *C10M 123/04* (2013.01); *C10M 169/04* (2013.01); *C08J 2367/00* (2013.01); *C08J 2375/04* (2013.01); *C08J 2377/00* (2013.01); *C10M 2201/0626* (2013.01); *C10M 2203/003* (2013.01); *C10M 2207/106* (2013.01); *C10M 2207/283* (2013.01); *C10M 2219/0445* (2013.01); *C10M 2221/041* (2013.01); *C10N 2020/04* (2013.01); *C10N 2030/02* (2013.01); *C10N 2050/10* (2013.01); *C10N 2050/14* (2020.05)

(58) Field of Classification Search
CPC .......... C10M 169/02; C10M 119/26; C10M 117/06; C10M 113/08; C10M 117/00; C10M 123/04; C10M 2203/003; C10M 2221/041; C10M 2207/283; C10M 2207/106; C10M 2201/0626; C10M 2201/085; C10M 2201/087; C10M 167/00; C10M 2207/1285; C10M 2207/1265; C10M 2207/124; C10M 2221/04; C10M 2207/2805; C10M 2207/2835; C08J 7/02; C08J 2377/00; C08J 2367/00; C08J 2375/04; C10N 2020/04; C10N 2030/02; C10N 2050/10; C10N 2050/14; C10N 2030/36; C10N 2010/04; C10N 2040/045; C10N 2020/02; C10N 2030/06; C10N 2030/26; C10N 2030/12

See application file for complete search history.

(56) References Cited

U.S. PATENT DOCUMENTS

| | | | |
|---|---|---|---|
| 3,249,537 A * | 5/1966 | Kuncjohn | C10M 5/00 508/220 |
| 4,110,494 A | 8/1978 | Schindler et al. | |
| 4,392,967 A | 7/1983 | Alexander | |
| 4,409,112 A | 10/1983 | Urway, Jr. | |
| 4,544,410 A | 10/1985 | Karacsonyi et al. | |
| 4,749,583 A | 6/1988 | Branch | |
| 4,925,932 A | 5/1990 | Bertholet et al. | |
| 5,057,294 A | 10/1991 | Sheth et al. | |
| 5,082,887 A | 1/1992 | Brown et al. | |
| 5,164,006 A | 11/1992 | Chapnerkar et al. | |
| 5,430,234 A | 7/1995 | Wilis et al. | |
| 5,445,741 A | 8/1995 | Dilla et al. | |
| 5,776,329 A | 7/1998 | Krynitz et al. | |

(Continued)

FOREIGN PATENT DOCUMENTS

| | | | |
|---|---|---|---|
| CN | 1616612 A | 5/2005 | |
| DE | 102008034959 A1 * | 1/2010 | .......... C10M 117/02 |

(Continued)

OTHER PUBLICATIONS

Fredheim, Gura Elise et al. "Comparison of Molecular Weight and Molecular Weight Distributions of Softwood and Hardwood Lignosulfonates;" Journal of Wood Chemistry and Technology vol. 23, No. 2, pp. 197-215, 2003.

Fredheim, Gura Elise et al. "Molecular weight determination of lignosulfonates by size-exclusion chromatography and multi-angle laser light scattering;" Journal of Chromatography A, 942 (2002) pp. 191-199.

Fengel und Wegener, Wood: Chemistry, Ultrastructure, Reactions, S. 282ff., 545-549, Berlin: de Gruyter 1984 Sarkanen und Ludwig, Lignins, S. 597-637, NewYork: Wiley 1971; Ullmann (4.) 16, 255-258.

(Continued)

*Primary Examiner* — Taiwo Oladapo

(74) *Attorney, Agent, or Firm* — D'Ambrosio & Menon, PLLC; Usha Menon

(57) ABSTRACT

A constant velocity joint having a boot constructed from a thermoplastic polyether ester as the boot material. The boot includes a lubricating grease composition for lubricating the constant velocity joint, the lubricating grease composition comprising calcium lignin sulfonate.

22 Claims, No Drawings

(56) References Cited

U.S. PATENT DOCUMENTS

| | | |
|---|---|---|
| 5,783,714 A | 7/1998 | McKenna et al. |
| 5,830,832 A | 11/1998 | Benda et al. |
| 5,880,281 A | 3/1999 | Argese et al. |
| 6,013,793 A | 1/2000 | Argese et al. |
| 6,107,259 A | 8/2000 | Muir et al. |
| 6,150,520 A | 11/2000 | Argese et al. |
| 6,325,986 B1 | 12/2001 | Marzar et al. |
| 6,342,597 B1 | 1/2002 | Geremia et al. |
| 6,432,886 B1 | 8/2002 | Reidmeyer |
| 6,446,974 B1 | 9/2002 | Malone et al. |
| 6,528,661 B2 | 3/2003 | Niddam et al. |
| 6,630,022 B2 | 10/2003 | Lessard et al. |
| 6,652,820 B2 | 11/2003 | Bakke |
| 6,653,470 B1 | 11/2003 | Argese et al. |
| 6,838,108 B2 | 1/2005 | Rodriguez et al. |
| 7,094,922 B2 | 8/2006 | De Kraker et al. |
| 7,342,120 B2 | 3/2008 | Aronhime et al. |
| 7,635,729 B2 | 12/2009 | Nip |
| 7,799,128 B2 | 9/2010 | Guynn et al. |
| 7,972,432 B2 | 7/2011 | Guynn et al. |
| 8,323,399 B2 | 12/2012 | Guynn et al. |
| 8,603,958 B2 | 12/2013 | Litters et al. |
| 8,759,252 B1 | 6/2014 | Callaway |
| 2005/0082014 A1* | 4/2005 | Spagnoli .................. B01J 19/26 159/23 |
| 2008/0269087 A1 | 10/2008 | Psaila et al. |
| 2009/0072184 A1* | 3/2009 | Yamaoka ............. C08G 63/672 252/62 |
| 2009/0247437 A1* | 10/2009 | E .......................... C10M 169/06 508/362 |
| 2011/0190177 A1* | 8/2011 | Zaki ..................... C10M 135/10 508/148 |
| 2013/0338049 A1 | 12/2013 | King et al. |

FOREIGN PATENT DOCUMENTS

| | | |
|---|---|---|
| JP | 11-131086 A | 5/1999 |
| JP | 2009-249419 A | 10/2009 |

OTHER PUBLICATIONS

C.J. Boner, 1954. Manufacture and Application of Lubricating Greases, pp. 52-23; Robert E. Krieger Publishing Co. Inc. 1971.

* cited by examiner

CONSTANT VELOCITY JOINT HAVING A BOOT

CROSS REFERENCE TO RELATED APPLICATIONS

This application is a continuation-in-part of and claims priority to U.S. Ser. No. 15/427,878 filed on Feb. 8, 2017 which is a continuation-in-part of and claims priority to U.S. Ser. No. 13/576,857 filed Aug. 2, 2012, which is a U.S. National Stage filing under 35 U.S.C. 371 of PCT application number PCT/DE2011/000087 filed on Jan. 31, 2011, claiming benefit of German application no. 10 2010 0006 745.8, filed Feb. 2, 2010, the contents of which are incorporated by reference herein.

FIELD OF INVENTION

The invention relates to a constant velocity joint having a boot constructed from a thermoplastic material as the boot material. The boot includes a lubricating grease composition for lubricating the constant velocity joint. The thermoplastic boot material can be selected from a group consisting of a thermoplastic polyurethane, a thermoplastic polyamide, a thermoplastic polyolefins, a thermoplastic polyester, and a thermoplastic elastomer vulcanizate and preferably is a thermoplastic polyether ester. Lignin is a complex polymer based on phenylpropane units, which are cross-linked to each other with a wide variety of different chemical bonds. Lignin is present in plant cells together with cellulose and hemicellulose. Lignin itself is a cross-linked macromolecule with average molecular weights of for example at least 10,000 g/mol (weight average).

There are essentially 3 types of monolignol monomers that can be identified as monomer components of lignin, and they differ in the degree of their methoxylation. They are p-coumaryl alcohol, coniferyl alcohol and sinapyl alcohol. These lignols are incorporated in the lignin structure in the form of hydroxyphenyl (H)-, guaiacyl (G)- and syringal (S) units. Naked-seeded plants (gymnosperms) such as pine trees contain mostly G units and low proportions of H units. All lignins contain small amounts of incomplete or modified monolignols. The primary function of lignins in plants is to lend them mechanical stability by cross-linking the vegetable polysaccharides. Lignin constitutes about ⅓ of the dry mass of wood, and according to rough estimates 30% of the non-fossil organic carbon mass on Earth. It is the third most abundant organic material after cellulose and chitin, and is thus a very readily available, renewable raw material for industrial products.

Lignin sulfonate is obtained as a by-product of paper manufacturing using the sulfite process. In this process, wood that has been reduced to wood chips is heated for about 7 to 15 hours in the presence of calcium hydrogen sulfite liquor and under pressure (for example 5 to 7 bar) and then the ligninsulfonic acid is removed from the lignocellulose in the form of calcium lignin sulfonate in a washing and precipitation process. Liquors of magnesium, sodium or ammonium sulfide can also be used instead of calcium hydrogen sulfite, and these produce the corresponding magnesium, sodium and ammonium salts of ligninsulfonic acid.

When the washing liquor is evaporated, powdery lignin sulfonates remain. Annual worldwide production of lignin sulfonates is in the order of 55 million tons.

Sodium, calcium and magnesium lignin sulfonates are often used as the raw material for plasticising and liquefying concrete and mortar. Lignin sulfonates are also used as pelletising promoters in the kraft animal feed industry and as dispersing or complexing agents in other fields.

In modern lubricating grease formulations, a not inconsiderable proportion of the formulation cost is devoted to tribochemically acting extreme pressure and anti-wear additives (EP/AW additive), with the result that they often become the price drivers for lubricating greases.

Many of these additives are produced in complicated, multistage synthesis processes, and their use is limited both in terms of the nature of the application and of their effective concentration in the final formulation due to the toxicological side effects that occur in many cases. In some applications, for example in constant velocity joint shafts or in slow running and heavily loaded rolling bearings, deficient lubrication conditions and/or contact between friction partners is unavoidable even when liquid additives are introduced. Former practice in such cases was to use solid lubricants based on inorganic compounds (for example phosphate salts of calcium and zinc), plastic powders (for example PTFE) or metal sulfides (for example $MoS_2$). But these components are also often expensive and can have a critical effect on the overall cost of a lubricant formulation.

Former practice in lubricating grease production was to introduce these additives in a second process step, performed after the actual chemical reaction process of thickener formation. In this method, additives, particularly solid lubricants, must be distributed homogeneously throughout the relatively viscous lubricating grease by intensive mixing and shearing processes with relatively high mechanical effort in order to obtain their optimum effect. From a modern perspective, the following has often proven disadvantageous and prompted the present invention.

Usual lubricant additives and solid lubricants are normally based on non-renewable raw materials and are often poorly biodegradable.

Furthermore, most common anti-wear additives and friction reducing lubricant additives entail expensive chemical synthesis processes, which represent a significant cost factor. Particularly when solid lubricants are used for heavily loaded friction points, materials most frequently used are relatively expensive, for example $MoS_2$ or PTFE.

Lubricating greases containing sodium lignin sulfonates and sodium soaps or lithium soaps are already known from U.S. Pat. No. 3,239,537 A. However, these are not suitable for use in lubricating constant velocity joint shafts, amongst others because the grease attacks the TPE materials that are used in the boot.

Object/Advantage of the Invention

The object of the invention is therefore to avoid the drawbacks of the prior art as described in the preceding, and to make lignin sulfonates available in lubricating greases both as cost-effective structure forming agents and as additives to promote wear resistance, reduce friction and protect against ageing, and at the same time to lend the lubricating greases good water resistance.

The presence of lignin sulfonate means that the use of other common lubricant additives and solid lubricants, particularly $MoS_2$, may be minimised or entirely dispensed with.

SUMMARY OF THE INVENTION

The invention is defined by the independent claims. Preferred variations represent the objects of the dependent claims or are described in the following.

According to the invention the constant velocity joint is covered by a boot constructed from a thermoplastic polyether ester as boot material. The boot is sometimes also called a bellow but commonly more specifically called a drive shaft boot. The boot includes a lubricating grease composition for lubricating the constant velocity joint comprising calcium lignin sulfonate. According to one embodiment the lubricating grease composition includes:

55 to 92 wt %, base oil;
0 to 40 wt %, additives;
3 to 40 wt %, calcium soaps of a saturated or unsaturated monocarboxylic acid having 10 to 32 carbon atoms, optionally substituted;
a complex soap obtained by the action of 0.5 to 10 wt % complexing agent on the composition. The complexing agent is selected from:
(i) a calcium salt of: a saturated or unsaturated monocarboxylic acid or hydroxycarboxylic acids each having 2 to 8 carbon atoms, a dicarboxylic acid having 2 to 16 carbon atoms, each of which is optionally substituted;
(ii) an alkali or alkaline earth salt of boric acid and/or phosphoric acid, including the products of reaction thereof with LiOH and/or $Ca(OH)_2$, and
(iii) mixtures thereof, and
2 to 12 wt % calcium lignin sulfonate, relative in each case to the total composition of the lubricating grease, wherein the compound comprises a cone penetration value (worked penetration) from 265 to 385 mm/10 (at 25° C.), determined according to ISO 2137.

According to the process on which the present invention is based, first a precursor stage (base grease) is prepared by mixing at least
Base oil
Fatty acids and/or esters or salts thereof, wherein the fatty acid salt is at least partly a calcium salt, for producing soaps and containing at least calcium soaps,
Organic and/or inorganic complexing agents if necessary,
Alkaline earth hydroxides, wherein the alkaline earth hydroxides include at least CaOH,
Water if necessary (for example as part of the hydroxides), and
Ca-lignin sulfonate having average molecular weights (weight average) greater than 10000 g/mol.
and heating to drive out components with low boiling point when esters are used, and to initiate at least one conversion of the alkaline earth hydroxide with the fatty acids and/or esters thereof and the lignin sulfonate, including reacting with the complexing agents if complexing agents capable of reacting with the alkaline earth hydroxides are used, to form a thickener structure in the base oil.

Components with low boiling point are those components that boil at temperatures up to about 100° C. under normal pressure, such as water or C1- to C4-alcohols.

In order to produce the base grease, the mixture is preferably heated to temperatures above 120° C., or preferably above 180° C. The conversion to base grease takes place in a heated reactor, which may also be constructed as an autoclave or vacuum reactor.

Then, in a second step the formation of the thickener structure is completed by cooling and any additional components such as additives and/or base oil are added to adjust to the desired consistency or the desired properties profile. The second step may be carried out in the same reactor as was used for the first step, but it is preferable if the base grease is transferred from the reactor to a separate stirred tank reactor for cooling and for mixing in the additional components, if any.

If necessary, the lubricating grease obtained in this way may be homogenised, filtered and/or deaerated.

Preferred substances are Ca/Li-, Li/Ca- and calcium-thickened normal and complex soap greases to which calcium lignin sulfonate has already been added before the reaction phase to produce the base grease and is incorporated into the lubricating grease structure via a thermal process in such manner that it is present in highly homogeneous, oil-insoluble form and results in high dropping point temperatures.

The use of calcium salts for both the fatty acid salts and for the lignin sulfonate guarantees that salt metathesis does not take place either during the production of the base grease or during the application.

Salt metathesis, particularly with the salts of sodium, must be prevented in order to obtain a lubricating grease containing lignin sulfonate with good water resistance and at the same time a high dropping temperature. For this reason, the use of sodium lignin sulfonate and sodium hydroxide must be avoided. Water resistance is understood to mean that the grease is not emulsified by water and conforms to rating level 1-90 (test at 90° C.) in the test in accordance with DIN 51807-1 (version: 1979-04). Water resistance is further understood to mean that the grease conforms to rating level 1-80 (test at 80° C.) in the test in accordance with DIN 51807-2 (version 1990-03).

The simultaneous application of an excess of alkali in the form of excess calcium hydroxide and possibly also calcium acetate or other calcium salts as the complexing agents is intended to ensure that even small residual amounts of free sulfonic acid groups are neutralised in the lignin sulfonic acid and they lose their hygroscopic, water emulsifying and corrosion promoting action. A high process temperature, above 120° C. and particularly above 180° C. also ensures that the residual moisture that still remains in the lignin sulfonate is evaporated out of the reaction medium completely and any components of the lignin sulfonate that have not been neutralised are neutralised by the calcium hydroxide.

Standard lubricating oils that are liquid at room temperature are suitable for use as base oils. The base oil preferably has a kinematic viscosity from 20 to 2500 $mm^2$/s, particularly from 40 to 500 $mm^2$/s at 40° C.

The base oils may be classified as mineral oils or synthetic oils. Mineral oils that are eligible for consideration include for example naphthene basic and kerosene basic mineral oils according to their classification in API Group I. Chemically modified low-aromatic and low-sulfur mineral oils with a small fraction of saturated compounds and better viscosity/temperature behaviour than Group I oils, classified as API Group II and III are also suitable.

Regarding synthetic oils, polyethers, esters, polyalphaolefins, polyglycols and alkyl aromatics and mixtures thereof are noteworthy. The polyether compound may contain free hydroxyl groups, but it may also be wholly etherised or terminal group esterified and/or it may be produced from a starter compound having one or more hydroxy and/or carboxyl groups (—COOH). Polyphenyl ethers, whether alkylated or not, are also possible as the sole component, or better still as components of a mixture. Esters of an aromatic di-, tri- or tetracarboxylic acid with one or more C2- to C22 alcohols present in mixture, alcohols, esters of adipic acid, sebacic acid, trimethylolpropane, neopentyl glycol, pentaerythritol or dipentaerythritol with aliphatic, branched or linear, saturated or unsaturated C2 to C22 carboxylic acids, C18 dimer acid esters with C2 to C22 alcohols, complex esters, as single components or in any mixture thereof, are also suitable for use.

The soaps produced are either pure calcium soaps or mixtures containing calcium soaps, besides calcium soaps particularly lithium soaps and/or aluminium soaps of one or more saturated or unsaturated monocarboxylic acids having 10 to 32 carbon atoms, substituted or not, particularly having 12 to 22 carbon atoms, particularly preferably corresponding hydroxycarboxylic acids. Suitable carboxylic acids are for example lauric acid, myristic acid, palmitic acid, oleic acid, stearic acid or behenic acid and preferably 12-hydroxystearic acid. Even corresponding low alcohol esters, such as corresponding triglycerides and the methyl-, ethyl-, propyl-, isopropyl- or sec.-butyl esters of acid/hydroxy acid, may be used with saponification instead of the free acid group to achieve better dispersion.

The soap is converted into a complex soap by the presence of a complexing agent. The complex soaps containing lubricating grease compositions according to the invention (presence of a complexing agent) have higher dropping points, for example higher than 200° C. (DIN ISO 2176). Appropriate quantities for the addition of the complexing agent are from 0.5 to 20 wt %, particularly 0.5 to 10 wt %.

The following complexing agents are advantageous for the purposes of the present invention:
(a) calcium salts of a saturated or unsaturated monocarboxylic acid, or also hydroxycarboxylic acids having 2 to 8, particularly 2 to 4 carbon atoms, or a dicarboxylic acid having 2 to 16, particularly 2 to 12 carbon atoms, each of which may be substituted or unsubstituted, and/or
(b) the alkaline and/or alkaline earth salt of boric acid and or phosphoric acid, particularly the products of its reaction with LiOH and/or Ca(OH)$_2$.

Complexing agent (a) is preferably solely a calcium salt, particularly if this is used as calcium acetate to produce the base grease. Acetic acid and propionic acid are particularly suitable for use as monocarboxylic acids. Hydroxybenzoic acids such as parahydroxybenzoic acid, salicylic acids, 2-hydroxy-4-hexoylbenzoic acid, metahydroxybenzoic acid, 2,5-dihydroxybenzoic acid (gentisic acid), 2,6-dihydroxybenzoic acid (gamma-resorcylic acid) or 4-hydroxy-4-methoxybenzoic acid are also suitable. Particularly suitable dicarboxylic acids are adipic acid ($C_6H_{10}O_4$), sebacic acid ($C_{10}H_{18}O_4$), azelaic acid ($C_9H_{16}O_4$) and/or 3-tert.-butyladipic acid ($C_{10}H_{18}O_4$).

Possible substances for use as the borate (b) would include for example metaborate, diborate, tetraborate or orthoborate, such as monolithium orthoborate or calcium orthoborate. The phosphates might be selected from alkaline (preferably lithium) and alkaline earth (preferably calcium) dihydrogen phosphate, -hydrogen phosphate, or -pyrophosphate.

Optionally, bentonites, such as montmorillonite (in which some or all of the sodium ions may have been substituted with ammonium ions), aluminosilicates, clays, silicic acid (e.g. aerosil), oil-soluble polymers (e.g., polyolefins, poly (meth)acrylates, polyisobutylenes, polybutenes or PS) or also di- and polyureas may also be used as co-thickeners. The bentonites, aluminosilicates, clays, silicic acid and/or oil-soluble polymers may be added to produce the base grease or introduced as additives later, in the second step. The di- and polyureas may be introduced as additives.

The compounds according to the invention may also contain other additives as additional substances. Common additional substances for the purposes of the invention are antioxidants, anti-wear agents, corrosion protection agents, detergents, dyes, lubrication enhancers, viscosity additives, friction reducers and high-pressure additives.

Examples of such would be:
Antioxidants such as amine compounds (e.g. alkylamines or 1-phenyl-aminonaphthaline), aromatic amines, e.g. phenyl-naphthyl amines or diphenyl amines, phenol compounds (e.g., 2.6-di-tert-butyl-4-methylphenol), sulfur antioxidants, zinc dithiocarbamate or zinc dithiophosphate;
High-pressure additives such as organic chlorine compounds, sulfur, phosphorus or calcium borate, zinc dithiophosphate, organic bismuth compounds;
Substances designed to improve "oiliness", such as C2- to C6-polyols, fatty acids, fatty acid esters or animal or vegetable oils;
Anticorrosion agents such as petroleum sulfonate, dinonylnaphthalene sulfonate or sorbitan esters;
Metal deactivators such as benzotriazol or sodium nitrite;
Viscosity enhancers, such as polymethacrylate, polyisobutylene, oligo-dec-1-ene, and polystyrenes;
Anti-wear additives and friction reducers such as organomolybdenum complexes (OMC), molybdenum-di-alkyl-dithiophosphates, molybdenum-di-alkyl-dithiocarbamates or molybdenum sulfide-di-alkyl dithiocarbamates, particularly molybdenum-di-n-butyl dithiocarbamate and molybdenum disulfide-di-alkyl dithiocarbamate ($Mo_2O_mS_n$(dialkyl carbamate)$_2$ where m=0 to 3 and n=4 to 1),
Friction reducers such as functional polymers, e.g. oleyl amides, organic polyether- and amide-based compounds, for example alkyl polyethylene glycol tetradecylene glycol ether.

In addition, the lubricating grease compounds according to the invention also contain usual additives for protection against corrosion, oxidation and attack by metals, which function as chelating compounds, radical scavengers, UV converters, reaction layer forming agents and the like.

Solid lubricants may be selected for example from the group of polymer powders such as polyamides, polyimides or PTFE, graphite, metal oxides, boron nitride, metal sulfides such as molybdenum sulfide, tungsten disulfide or sulfide mixtures with tungsten, molybdenum, bismuth, tin and zinc base, inorganic salts of alkali and alkaline earth metals, such as calcium carbonate, sodium and calcium phosphates. Solid lubricants may be divided into the following four groups: compounds with a lattice layer structure, such as molybdenum disulfide and tungsten disulfide, graphite, hexagonal boron nitride and certain metal halides; oxidic and hydroxidic compounds of the transition and alkaline earth metals and carbonates or phosphates thereof; soft metals and/or plastics. The desired, advantageous lubricating properties may be adjusted with the use of lignin sulfonates with having to use solid lubricants. In many cases, solid lubricants may be omitted entirely, or at least significantly reduced. If solid lubricants are used, graphite is the most favourable.

Lignin sulfonate may be chosen from calcium lignin sulfonates have a molecular weight (Mw, weight average) greater than 10,000, particularly greater than 12,000 or even greater than 15,000 g/mol, for example from 10,000 up to 65,000 g/mol or 15,000-65,000 g/mol and particularly containing 2 to 12 wt %, particularly 4 to 10 wt %, sulfur (calculated as elemental sulfur) and/or 5 to 15 wt %, particularly 8 to 15 wt % calcium (calculated Ca). Besides, calcium lignin sulfonates, other alkaline earth lignin sulfonates may also be used. The average molecular weight (weight average) is determined for example by size exclusion chromatography. A suitable method is the SEC-MALLS method as described in the article by G. E. Fredheim, S. M. Braaten and B. E. Christensen, "Comparison of molecular weight and molecular weight distribution of softwood and hardwood lignosulfonates" published in "Journal of Wood Chemistry and Technology", Vol, 23, No. 2, pages 197-215, 2003 and the article "Molecular weight determination of lignosulfonates by size exclusion chromatography and multi-angle laser scattering" by the same authors, published in the "Journal of Chromatography A", Volume 942, edition 1-2, 4 Jan. 2002, pages 191-199 (mobile phase: Phosphate DMSO-SDS, stationary phase: Jordi-Glukose-DVB as described in 2.5), Suitable calcium lignin sulfonates are for example the commercially available products Norlig 11 D and Borrement Ca 120 produced by Borregard Lignotech.

The lubricating grease according to the invention is characterized by the following composition:
a) 55 to 92 wt %, particularly 70 to 85 wt %, base oil,
b) 0 to 40 wt %, particularly 2 to 10 wt %, additives,
c) 3 to 40 wt %, particularly 5 to 20 wt %, soaps, and
d) 0.5 to 20 wt %, particularly 0.5 to 10 wt %, complexing agents, and
e) optionally excess $Ca(OH)_2$, preferably 0.01 to 2 wt %, 0.5 to 15, particularly 2 to 12 wt %, and particularly preferably 3 to 8 wt % lignin sulfonate, particularly calcium lignin sulfonate,
relative in each case to the overall composition, wherein the components and their preferred variants have been defined in the preceding.

It was found that lignin sulfonates function as structure forming agents for water-resistant lubricating greases that also have properties as a solid lubricants or anti-wear additives and ageing stabilisers. At the same time, lignin sulfonate was observed to have surprisingly synergistic effects with other solid lubricants, for example with graphite or calcium carbonate.

It was also found that lignin sulfonates serve as multifunctional components for lubricants. Due to the large number of polar groups and aromatic structures they contain, their polymer structure and their low solubility in all types of lubricating oils, lignin sulfonates are suitable for use not only as a thickener component but also as solid lubricants in lubricating greases and lubricating pastes. Their sulfur content also enhances their EP/AW effect in the lubricating greases and the phenolic structures provide an age-inhibiting effect.

It is assumed that due to the large number of polymer and polar aromatic units it contains, the lignin sulfonate structure is predominantly planar.

Accordingly, they are able to be deposited very well in layer structures on metal surfaces under due to the effect of external frictional and shearing forces, because the aromatic nuclei of the lignin sulfonate enter into an associative reciprocal action with the metal surface, and metallic friction partners are separated from each other effectively and permanently even under heavy loads and high pressures.

If calcium lignin sulfonate is added before the start of the reaction phase during the production of soap thickeners, particularly of calcium complex soaps, not only is the thickening effect of these soaps enhanced with a high dropping point, but the anti-wear protection and lubrication effects of corresponding lubricating grease formulations are also enhanced. Consequently, it is beneficial for the distribution and effect of additives and solid lubricants if they are chemically or mechanically incorporated in the thickener structure as an additional structural element in situ during the reaction phase.

According to the prior art, it is necessary in many cases to use specially treated, expensive fatty acids, such as 12-hydroxystearic acid, or special complexing agents such as borates or salts of acetic acid, sebacic acid and azelaic acid to manufacture soap greases with high dropping points, yet these substances have little or no additional effect as anti-wear protection and friction reducing additives. If Ca-lignin sulfonates are included, the use of these other components may be reduced significantly or even dispensed with altogether. The use of Ca-lignin sulfonates further offers the capability to formulate high-performance lubricating greases on the basis of renewable raw materials and abandon an additive-orientated chemistry that is detrimental to the environment.

If oils consisting of unmodified or easily modified native fatty acid esters are thickened using metal soaps based on animal or vegetable fatty acids, and if lignin sulfonates are used as the only additional thickening agent and at the same time the only additive component, lubricating greases are obtained that have been produced almost exclusively on the basis of renewable raw materials, the only exception being calcium hydroxide used for the metal soaps. These greases protect against ageing and wear, and have the effect of raising the seizure load and lowering friction when lignin sulfonates are included as a thickener component.

The lubricating greases according to the invention are particularly suitable for use in or for constant velocity joint shafts, rolling bearings and gearboxes.

If the base oils used consist of readily biodegradable esters, such as those that contain mostly renewable raw materials, the lubricating greases are also suitable for total loss lubrication in the environmentally sensitive area (for example in mining or agriculture).

In the special case of lubrication for maintenance-free constant velocity joint shafts, the first lubricating grease has been formulated using calcium lignin sulfonate that differs from the prior art in that it assures long operating life and good levels of efficiency entirely without the use of $MoS_2$ and other organic and inorganic molybdenum compounds.

The absence of other additives also serves to lower the friction coefficient, protect against seizure load and wear and renders the product highly compatible with the materials used in standard commercial constant velocity joint shaft bellows, such as chloroprene rubber and thermoplastic polyether esters. Since the sulfur contained in lignin sulfonate is bound by thermally stable sulfonate groups, unlike the bound sulfur in conventional additives it is only released at very high temperatures and/or with very high levels of activation energies, such as do not occur in lubricating grease applications except with tribocontacts under very high loads. In this way, subsequent vulcanisation or crosslinking of rubber materials by the sulfur released from ageing lubricant is largely prevented.

If calcium lignin sulfonate is used in a lubricating grease formulation that has been adjusted with excess calcium hydroxide to be overbasic, this prevents free lignin sulfonic acid from having a hydrolytic effect on materials used in the bellows, such as thermoplastic polyether esters.

A special aspect of the present invention is that it may be used to obtain cost-optimised lubricating grease formulations for lubricating points that are under heavy load, such as in constant velocity joints in particular, and that are well compatible with bellows containing, for example, thermoplastic polyether esters (TPE) and chloroprenes (CR), while offering a high degree of efficiency, low wear and a long service life.

EXAMPLES OF PRODUCTION

Example A (Comparison Example)

958 g tallow fatty acid, 958 g beef tallow, 958 g calcium acetate, 27.7 g trisodium phosphate, 27.7 g calcium borate and 358 g calcium hydroxide were placed in a reactor in 12,000 g of a base oil mixture and 150 ml water was added. This base was heated to 198° C. in a defined temperature programme while stirring so that the added water and the reaction water evaporated. Additives (see table) were added to the base at certain temperatures during the cooling phase. After the base was adjusted to the desired consistency by adding 3700 g of the base oil mixture, the final product was homogenised in a toothed colloid mill. The grease obtained thereby is suitable for use as constant velocity joint shaft grease, for example.

Example B 460 g tallow fatty acid, 445 g beef tallow, 460 g calcium acetate, 27.7 g trisodium phosphate, 27.7 g calcium borate and 168 g calcium hydroxide and 920 g calcium lignin sulfonate (Norlig 11D powder manufactured by Borregard Lignotech) were placed in a reactor in 14,000 g of a base oil mixture and 150 ml water was added. This base was heated to 208° C. in a defined temperature programme while stirring so that the added water and the reaction water evaporated. Additives (see table) were added to the base at certain temperatures during the cooling phase. After the base was adjusted to the desired consistency by adding 3450 g of the base oil mixture, the final product was homogenised in a toothed colloid mill. The grease obtained thereby is suitable for use as constant velocity joint shaft grease, for example.

Example C (Comparison Example)

800 g 12-hydroxy stearic acid, 288 g sebacic acid, 388 g calcium acetate and 157.3 g calcium hydroxide were placed in a reactor in 5000 g of a base oil mixture. 64 g $LiOH \times H_2O$ was dissolved in 250 ml water and added. This base was heated to 200° C. in a defined temperature programme while stirring so that the added water and the reaction water evaporated. Additives were added to the base at certain temperatures during the cooling phase.

After the base was adjusted to the desired consistency by adding 3116 g of the base oil mixture, the final product was homogenised in a toothed colloid mill. The grease obtained thereby is suitable for use as rolling bearing grease, for example.

Example D 600 g 12-hydroxy stearic acid, 216 g sebacic acid, 291 g calcium acetate and 720 g calcium hydroxide and 300 g calcium lignin sulfonate (Norlig 11D powder manufactured by Borregard Lignotech) were placed in a reactor in 5000 g of a base oil mixture. 48 g $LiOH \times H_2O$ was dissolved in 250 ml water and added. This base was heated to 200° C. in a defined temperature programme while stirring so that the added water and the reaction water evaporated. Additives were added to the base at certain temperatures during the cooling phase. After the base was adjusted to the desired consistency by adding 3116 g of the base oil mixture, the final product was homogenised in a toothed colloid mill. The grease obtained thereby is suitable for use as rolling bearing grease, for example.

Example E (Comparison Example)

1380 g tallow fatty acid, 1360 g beef tallow, 80 g trisodium phosphate, 80 g calcium borate, 1400 g calcium acetate and 493 g calcium hydroxide were placed in a reactor in 12,000 g of a base oil mixture and 150 ml water was added. This base was heated to 230° C. in a defined temperature programme while stirring so that the added water and the reaction water evaporated. Additives (see table) were added to the base at certain temperatures during the cooling phase. After the base was adjusted to the desired consistency by adding 3125 g of the base oil mixture, the final product was homogenised in a toothed colloid mill. The grease obtained thereby is suitable for use as rolling bearing grease, for example.

Example F 1260 g tallow fatty acid, 1240 g beef tallow, 80 g trisodium phosphate, 80 g calcium borate, 1278 g calcium acetate, 493 g calcium hydroxide and 885 g calcium lignin sulfonate (Norlig 11D Powder manufactured by Borregard Lignotech) were placed in a reactor in 12,000 g of a base oil mixture and 150 ml water was added. This base was heated to 225° C. in a defined temperature programme while stirring so that the added water and the reaction water evaporated. Additives were added to the base at certain temperatures during the cooling phase. After the base was adjusted to the desired consistency by adding 3125 g of the base oil mixture, the final product was homogenised in a toothed colloid mill. The grease obtained thereby is suitable for use as rolling bearing grease, for example.

Example G (Comparison Example)

975 g calcium-12 hydroxy stearate, 225 g calcium acetate and 15 g calcium borate were placed in a reactor in 3500 g methyl oleate ester. This base was heated to 200° C. in a defined temperature programme while stirring. Additives were added to the base at certain temperatures during the cooling phase. After the base was adjusted to the desired consistency by adding 180 g methyl oleate ester, the final product was homogenised in a 3-roller mill. The lubricating grease obtained thereby is made on the basis of predominantly renewable raw materials.

Example H 841 g calcium 12-hydroxy stearate, 219.5 g calcium acetate, 15 g calcium borate and 418 g calcium lignin sulfonate (Norlig 11D Powder manufactured by Borregard Lignotech) were placed in a reactor in 1965 g methyl oleate ester. This base was heated to 200° C. in a defined temperature programme while stirring. Additives were added to the base at certain temperatures during the cooling phase. After the base was adjusted to the desired consistency by adding 1684 g trimethylolpropane trioleate ester, the final product was homogenised in a 3-roller mill. The lubricating grease obtained thereby is made on the basis of predominantly renewable raw materials.

Examples I and J

The products of example formulations I and J are similar to the production of example H but with the use of different quantities of calcium-12 hydroxy stearate, calcium acetate and calcium lignin sulfonate and different compositions of ester base oils. The lubricating greases obtained thereby are made on the basis of predominantly renewable raw materials.

TABLE 1

Joint shaft grease formulations

| Description | Method | Unit | Example A<br>Reference calcium complex with MoS2 | Example B<br>Invention calcium complex with 6% lignin sulfonate |
|---|---|---|---|---|
| 1. Thickener: | | | | |
| 1.1 Lignin sulfonate: | | | | |
| Calcium lignin sulfonate | | | 0.0 | 6.1 |
| 1.2 Fatty acids/-triglycerides: | | | | |
| Mixed fatty acids | | | 4.8 | 2.9 |
| Mixed triglycerides | | | 4.8 | 2.8 |
| 1.3 Alkali hydroxide: | | | | |
| Ca(OH)2 | | | 1.8 | 1.5 |
| 1.4 Complexing agent: | | | | |
| Ca acetate | | | 4.8 | 3.0 |
| Ca borate | | | 0.1 | 0.2 |
| 2. Base oils: | | | | |
| Mixed basic mineral oil (at v40 = 100 mm$^2$/s) | | | 79.5 | 80.8 |
| 3. Additives: | | | | |
| Antioxidant 1 | | | 0.6 | 0.5 |
| Antioxidant 2 | | | 0.6 | 0.5 |
| Corrosion protection | | | 0.5 | 0.2 |
| Solid lubricant, graphite | | | 0.5 | 1.0 |
| Solid lubricant, MoS2 | | | 1.8 | 0.0 |
| Total | | | 100 | 100 |
| 4. Characteristics | | | | |
| 4.1 General physical data | | | | |
| Penetration unworked | DIN ISO 2137 | 0.1 mm | 263 | 315 |
| Penetration worked 60 double cycles | DIN ISO 2137 | 0.1 mm | 351 | 340 |
| Copper corrosion 24 h/100° C. | DIN 51811 | Evaluation level | 1-100 | 1-100 |
| Dropping point | DIN ISO 2176 | ° C. | 240 | 280 |
| Oil separation 18 h/40° C. | DIN 51817 | % | 0.4 | 2.1 |
| Oil separation 7 d/40° C. | DIN 51817 | % | 2 | 8.9 |
| 4.2 Water resistance | | | | |
| Static water resistance 3 h/90° C. | DIN 51807-1 | Evaluation level | 1-90 | 1-90 |
| Washout loss at 80° C. | DIN 51807-2 | Evaluation level | 1 | 1 |
| 4.3 Friction reduction | | | | |
| SRV at 80° C. (40 Hz, 1.5 mm Amplitude, 500 N load) | ASTM D D5707-05 | | | |
| Friction coefficient | | | 0.107 | 0.097 |
| Process | | | steady | steady |
| SRV at 150° C. (40 Hz, 1.5 mm Amplitude, 500 N load) | ASTM D D5707-05 | | | |
| Friction coefficient | | | 0.097 | 0.085 |
| Process | | | steady | steady |
| 4.4 Anti-wear protection | | | | |
| VKA weld load | DIN 51350-4 | N | 3400 | 3800 N |
| VKA calotte 1000 N/1 min | DIN 51350-5 | mm | 1.02 | 0.62 |
| 4.5 Compatibility with bellows materials | | | | |
| 4.6.1 Chloroprene Inepsa 4012 168 h/120° C. | | | | |
| Shore A | DIN 53505 | | −2 | −1 |
| Volume change | DIN 53521 | % | +3.5 | −0.5 |
| Change in tensile strength | DIN 53504 | % | −0.5 | −1.2 |
| Change in elongation | DIN 53504 | % | −22.1 | −19 |
| 4.6.2 NBR rubber | | | | |
| SRE NBR 34 7 d/100° C. | DIN 53538-3 | | | |
| Shore A | DIN 53505 | | −2 | −3 |
| Volume change | DIN 53521 | % | +3.4 | +3.1 |
| Change in tensile strength | DIN 53504 | % | −2.9 | −5 |
| Change in elongation | DIN 53504 | % | −7.8 | −4.5 |

TABLE 1-continued

Joint shaft grease formulations

| Description | Method | Unit | Example A Reference calcium complex with MoS2 | Example B Invention calcium complex with 6% lignin sulfonate |
|---|---|---|---|---|
| 4.6.3 TPE elastomer | | | | |
| Hytrel 8332 336 h/125° C. | | | | |
| Shore D | DIN 53505 | | −3 | −2 |
| Volume change | DIN 53521 | % | +13.1 | +6.2 |
| Change in tensile strength | DIN 53504 | % | −32.9 | +6.7 |
| Change in elongation | DIN 53504 | % | −27 | +61 |
| Arnitel EB 463 336 h/125° C. | | | | |
| Shore D | DIN 53505 | | −6 | 0 |
| Volume change | DIN 53521 | % | +10.7 | +10.2 |
| Change in tensile strength | DIN 53504 | % | −15 | −19.7 |
| Change in elongation | DIN 53504 | % | −10 | +7.8 |
| 4.6.4 EPDM rubber | | | | |
| Vamac Y76HR 336 h/125° C. | | | | |
| Shore A | DIN 53505 | | +3 | +5 |
| Volume change | DIN 53521 | % | +6 | +0.3 |
| Change in tensile strength | DIN 53504 | % | −17.4 | −1.8 |
| Change in elongation | DIN 53504 | % | −39 | −35 |
| 5. Service life test on the constant velocity joint shaft | | | | |
| Service life | Overrollings (mill.) | | 13.6 | 11.2 |
| Average steady-state temperature | ° C. | | 41.1 | 38.8 |

TABLE 2

Rolling bearing grease formulations

| Description | Method | Unit | Example C Reference Calcium/Lithium complex | Example D Invention Calcium/Lithium complex with 6% lignin sulfonate | Example E Reference Calcium Complex | Example F Invention Calcium/Lithium complex with 5% lignin sulfonate |
|---|---|---|---|---|---|---|
| 1. Thickener: | | | | | | |
| 1.1 Lignin sulfonate: | | | | | | |
| Calcium lignin sulfonate | | | 0.0 | 6.0 | 0 | 5.1 |
| 1.2 Fatty acids/-triglycerides: | | | | | | |
| 12-HSA | | | 8.0 | 5.0 | | |
| Mixed fatty acids | | | | | 6.9 | 5.6 |
| Mixed triglycerides | | | | | 6.8 | 5.4 |
| 1.3 Alkali hydroxide: | | | | | | |
| LiOH*H2O | | | 0.6 | 0.4 | | |
| Ca(OH)2 | | | 1.6 | 1.0 | 2.5 | 2.0 |
| 1.4 Complexing agent: | | | | | | |
| Sebacic acid | | | 2.9 | 1.8 | | |
| Ca acetate | | | 3.9 | 2.4 | 7.0 | 5.7 |
| Ca borate | | | | | 0.4 | 0.3 |
| 2. Base oils: | | | | | | |
| Mixed basic mineral oil (at v40 = 100 mm$^2$/s) | | | 81.6 | 82.0 | 75.6 | 75.3 |

TABLE 2-continued

Rolling bearing grease formulations

| | | | Example | | | |
|---|---|---|---|---|---|---|
| | | | C | D | E | F |
| | | | \multicolumn{4}{c}{Description} | | | |
| | Method | Unit | Reference Calcium/Lithium complex | Invention Calcium/Lithium complex with 6% lignin sulfonate | Reference Calcium Complex | Invention Calcium/Lithium complex with 5% lignin sulfonate |
| 3. Additives: | | | | | | |
| Antioxidant 1 | | | 0.2 | 0.2 | 0.2 | 0.2 |
| Antioxidant 2 | | | 0.2 | 0.2 | 0.2 | 0.2 |
| Corrosion protection | | | 1 | 1 | 0.4 | 0.3 |
| Total | | | 100 | 100 | 100 | 100 |
| 4. Characteristics | | | | | | |
| 4.1 General physical data | | | | | | |
| Penetration unworked | DIN ISO 2137 | 0.1 mm | 299 | 278 | 199 | 196 |
| Penetration worked, 60 double cycles | DIN ISO 2137 | 0.1 mm | 310 | 299 | 234 | 242 |
| Dropping point | DIN ISO 2176 | ° C. | 206 | 230 | 255 | >260 |
| Oil separation 18 h/40° C. | DIN 51817 | % | 2.2 | 1.1 | 0 | 0 |
| Oil separation 7 d/40° C. | DIN 51817 | % | 4.1 | 3.9 | 0.8 | 0.6 |
| 4.2 Water resistance | | | | | | |
| Static water resistance 3 h/90° C. | DIN 51807-1 | Evaluation level | 1-90 | 1-90 | 1-90 | 1-90 |
| Washout loss at 80° C. | DIN 51807-2 | Evaluation level | 1 | 1 | 1 | 1 |
| 4.3 Corrosion protection | | | | | | |
| Emcor distilled water | DIN 51802 | Evaluation level | 0-0 | 0-0 | 0-0 | 0-0 |
| 4.5 Anti-wear protection efficiency | | | | | | |
| VKA weld load | DIN 51350-4 | N | 2000 | 3400 | 2000 | 3200 |
| VKA calotte 1000 N/1 min | DIN 51350-5 | 0.1 mm | 0.91 | 0.45 | 0.89 | 0.67 |
| 5. Rolling bearing tests | | | | | | |
| FAG-FE9 (A/1500/6000/120° C.) | DIN51821-2 | | | | | |
| Average operating life L10 | | | 78 | 110 | 35 | 78 |
| Average operating life L50 | | | 115 | 220 | 74 | 156 |

TABLE 3

Lubricating grease formulation with base oils from renewable raw materials

| | | | Example | | | |
|---|---|---|---|---|---|---|
| | | | G | H | I | J |
| | | | \multicolumn{4}{c}{Description} | | | |
| | Method | Unit | Reference Calcium Complex | Invention Calcium Complex | Invention Calcium Complex | Invention Calcium Complex |
| 1. Thickener: | | | | | | |
| 1.1 Lignin sulfonate: | | | | | | |
| Calcium lignin sulfonate | | | 0 | 7.1 | 9.9 | 5.1 |
| 1.2 Finished soaps: | | | | | | |
| Ca-12 hydroxy stearate | | | 19.5 | 14.1 | 19.8 | 10.1 |
| 1.6 Complexing agent: | | | | | | |
| Ca acetate | | | 4.5 | 2.9 | 4.0 | 2.1 |
| Ca borate | | | 0.3 | 0.2 | 0.3 | 0.1 |
| 2. Base oils: | | | | | | |
| Trimethylol propane trioleate | | | | | | 28.5 |
| Methyl oleate | | | 73.6 | 73.6 | 63.9 | 52.1 |

TABLE 3-continued

Lubricating grease formulation with base oils from renewable raw materials

| | | | Example G | Example H | Example I | Example J |
|---|---|---|---|---|---|---|
| | Method | Unit | Reference Calcium Complex | Invention Calcium Complex | Invention Calcium Complex | Invention Calcium Complex |
| 3. Additives: | | | | | | |
| Antioxidant | | | 0.1 | 0.1 | 0.1 | 0.1 |
| Corrosion protection | | | 2 | 2.0 | 2.0 | 2.0 |
| Total | | | 100 | 100 | 100 | 100 |
| 4. Characteristics | | | | | | |
| 4.1 General physical data | | | | | | |
| Penetration unworked | DIN ISO 2137 | 0.1 mm | 189 | 108 | 170 | 232 |
| Penetration worked, 60 double cycles | DIN ISO 2137 | 0.1 mm | 221 | 209 | 219 | 301 |
| Copper corrosion 24 h/100° C. | DIN 51811 | Evaluation level | 1-100 | 1-100 | 1-100 | 1-100 |
| Dropping point | DIN ISO 2176 | ° C. | 210 | 250 | 248 | 205 |
| Oil separation 18 h/40° C. | DIN 51817 | % | 0.4 | 0.0 | 0.0 | 0.4 |
| Oil separation 7 d/40° C. | DIN 51817 | % | 0.6 | 0.5 | 0.1 | 2.5 |
| 4.2 Water resistance | | | | | | |
| Static water resistance 3 h/90° C. | DIN 51807-1 | Evaluation level | 1-90 | 1-90 | 1-90 | 1-90 |
| 4.3 Corrosion protection | | | | | | |
| Emcor distilled water | DIN 51802 | Evaluation level | 1-1 | 1-1 | 1-1 | 1-1 |
| 4.5 Anti-wear protection | | | | | | |
| VKA weld load | DIN 51350-4 | N | 2000 | 2800 | 3000 | 2400 |
| VKA calotte 1000 N/1 min | DIN 51350-5 | 0.1 mm | 0.89 | 0.67 | 0.54 | 0.48 |

The invention claimed is:

1. A constant velocity joint having a boot constructed from a thermoplastic polyether ester as boot material the boot comprising a lubricating grease composition for lubricating the constant velocity joint the composition comprising:
   55 to 92 wt % base oil;
   0 to 40 wt % additives;
   3 to 40 wt % of a calcium soap, wherein the calcium soap is a calcium salt of one or more saturated or unsaturated monocarboxylic acids having 10 to 32 carbon atoms, optionally hydroxy substituted;
   0.5 to 20 wt % of the complexing agent, wherein the complexing agent is a calcium salt of one or more dicarboxylic acids having 2 to 16 carbon atoms or a calcium salt of one or more mono carboxylic acids having 2 to 8 carbon atoms, each of which is optionally substituted, or both;
   wherein the calcium soap and the complexing agent form a calcium complex soap, and
   2 to 15 wt % calcium lignin sulfonate;
   relative in each case to the total composition of the lubricating grease,
   wherein the lubricating grease composition has a cone penetration value (worked penetration) from 265 to 385 mm/10 (at 25° C.), determined according to ISO 2137.

2. The constant velocity joint according to claim 1, where the lubricating grease composition has a cone penetration value (worked penetration) from 285 to 355 mm/10, determined according to ISO 2137.

3. The constant velocity joint according to claim 1, where the base oil has a kinematic viscosity from 20 to 2500 mm$^2$/s, at 40° C.

4. The constant velocity joint according to claim 1, where the additive comprises one or more members selected from the following group:
   amine compounds, phenol compounds, sulfur antioxidants, zinc dithiocarbamate or zinc dithiophosphate as antioxidants;
   organic chlorine compounds, sulfur, phosphorus or calcium borate, zinc dithiophosphate, organic bismuth compounds as high pressure additives;
   C2- to C6-polyols, fatty acids, fatty acid esters or animal or vegetable oils;
   petroleum sulfonate, dinonylnaphthalone sulfonate or sorbitan ester as anticorrosion agents;
   benzotriazol or sodium nitrite as metal neutralisers;
   polymethacrylate, polyisobutylene, oligo-dec-1-enes and polystyrenes as viscosity enhancers;
   molybdenum dialkyl dithiocarbamates or molybdenum sulfide dialkyl dithiocarbamates or aromatic amines as anti-wear additives;
   functional polymers, comprising oleyl amides, polyether- and amide-based organic compounds, or molybdenum dithiocarbamate as friction modifiers, and polymer powders such as polyamides, polyimides or PTFE, graphite, metal oxides, boron nitride, metal sulfides such as molybdenum disulfide, tungsten disulfide or mixed sulfides with tungsten, molybdenum, bismuth, tin and zinc base, inorganic salts of alkaline and alkaline earth metals, such as calcium carbonate, sodium and calcium phosphates as solid lubricants.

5. The constant velocity joint according to claim 1, where the lubricating grease is water-resistant or not emulsified by water:
   a) in accordance with the test defined in DIN 51807-1, evaluation level 1-90, and/or b) in accordance with the test defined in DIN 51807-2 evaluation level 1-80.

6. The constant velocity joint according to claim 1, where the calcium lignin sulfonate has an average molecular weight (Mw, weight average) of more than 10,000 g/mol.

7. The constant velocity joint according to claim 1, where the lubricating grease composition comprises $Ca(OH)_2$.

8. The constant velocity joint according to claim 1, where the lubricating grease composition has a dropping point higher than 200° C. according to DIN ISO 2176.

9. The constant velocity joint according to claim 1 where the lubricating grease composition comprises:
- 70 to 85 wt % the base oil,
- 2 to 10 wt % the additives,
- 5 to 20 wt % calcium soaps of a saturated or unsaturated monocarboxylic acid having 10 to 32 carbon atoms, optionally substituted,
- 5 to 10 wt % of the complexing agent, and
- 2 to 8 wt % calcium lignin sulfonate.

10. The constant velocity joint according to claim 1, where the composition comprises 0.01 to 2 wt % $Ca(OH)_2$.

11. The constant velocity joint according to claim 1, where the calcium lignin sulfonate has an average molecular weight (Mw, weight average) of more than 15000 g/mol.

12. The constant velocity joint according to claim 1, where the composition contains 2 to 12 wt %, sulfur in the lignin sulfonate (calculated as elemental sulfur relative to the lignin sulfonate).

13. The constant velocity joint according to claim 1, where the composition contains 5 to 15 wt. calcium in the lignin sulfonate (calculated as Ca and relative to the lignin sulfonate).

14. The constant velocity joint according to claim 13, where the composition contains a base oil made on the basis of renewable raw materials.

15. The constant velocity joint according to claim 1, where the complexing agent consists of a calcium salt of a saturated or unsaturated monocarboxylic acid having 2 to 4 carbon atoms or a dicarboxylic acid having 2 to 12 carbon atoms, each of which is optionally substituted.

16. The constant velocity joint according to claim 1, where the composition comprises 2 to 12 wt % calcium lignin sulfonate.

17. The constant velocity joint according to claim 1, where the composition comprises 0.5 to 10 wt % of the complexing agent.

18. The constant velocity joint according to claim 1, where the composition comprises no $MoS_2$.

19. The constant velocity joint according to claim 1, wherein the lubricating grease composition further comprises a lithium soap.

20. The constant velocity joint according to claim 1, wherein the complexing agent further comprises an alkali or alkaline earth salt of boric acid and/or phosphoric acid, including the products of reaction thereof with LiOH and/or $Ca(OH)_2$.

21. A constant velocity joint having a boot constructed from a thermoplastic boot material, the thermoplastic boot material selected from a group consisting of a thermoplastic polyurethane, a thermoplastic polyamide, a thermoplastic polyolefins, a thermoplastic polyester, and a thermoplastic elastomer vulcanizate, the boot comprising a lubricating grease composition for lubricating the constant velocity joint the composition comprising:
- 55 to 92 wt % base oil;
- 0 to 40 wt % additives;
- 3 to 40 wt % of a calcium soap, wherein the calcium soap is a calcium salt of one or more saturated or unsaturated monocarboxylic acids having 10 to 32 carbon atoms, optionally hydroxy substituted;
- 0.5 to 20 wt % of the complexing agent, wherein the complexing agent is a calcium salt of one or more dicarboxylic acids having 2 to 16 carbon atoms or a calcium salt of one or more mono carboxylic acids having 2 to 8 carbon atoms, each of which is optionally substituted, or both;
- wherein the calcium soap and the complexing agent form a calcium complex soap, and
- 2 to 15 wt % calcium lignin sulfonate;

relative in each case to the total composition of the lubricating grease,
wherein the composition has a cone penetration value (worked penetration) from 265 to 385 mm/10 (at 25° C.), determined according to ISO 2137.

22. The constant velocity joint according to claim 20, wherein the thermoplastic boot material is selected from a group consisting of a thermoplastic polyurethane, a thermoplastic polyamide, and a thermoplastic polyester.

* * * * *

UNITED STATES PATENT AND TRADEMARK OFFICE
CERTIFICATE OF CORRECTION

| | |
|---|---|
| PATENT NO. | : 11,473,032 B2 |
| APPLICATION NO. | : 16/710817 |
| DATED | : October 18, 2022 |
| INVENTOR(S) | : Thomas Litters et al. |

It is certified that error appears in the above-identified patent and that said Letters Patent is hereby corrected as shown below:

In the Claims

In Claim 9, beginning at Line 13 delete "5" and replace with "0.5"

Signed and Sealed this
Thirtieth Day of May, 2023

*Katherine Kelly Vidal*

Katherine Kelly Vidal
*Director of the United States Patent and Trademark Office*